United States Patent
Toscano

(10) Patent No.: US 10,293,643 B2
(45) Date of Patent: May 21, 2019

(54) TIRE WITH FILLER STRIPS ENCLOSING BEAD CORES AND PLY ENDS

(71) Applicant: BRIDGESTONE CORPORATION, Tokyo (JP)

(72) Inventor: Marco Toscano, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 89 days.

(21) Appl. No.: 15/031,907

(22) PCT Filed: Dec. 10, 2014

(86) PCT No.: PCT/IB2014/066757
§ 371 (c)(1),
(2) Date: Apr. 25, 2016

(87) PCT Pub. No.: WO2015/087253
PCT Pub. Date: Jun. 18, 2015

(65) Prior Publication Data
US 2016/0263947 A1    Sep. 15, 2016

(30) Foreign Application Priority Data

Dec. 11, 2013  (IT) .............................. RM2013A0681

(51) Int. Cl.
*B60C 15/06* (2006.01)
*B29D 30/48* (2006.01)
(Continued)

(52) U.S. Cl.
CPC .......... *B60C 15/0603* (2013.01); *B29D 30/30* (2013.01); *B29D 30/32* (2013.01);
(Continued)

(58) Field of Classification Search
CPC ............ B60C 15/0603; B60C 15/0632; B60C 15/0009; B60C 15/06; B60C 9/02;
(Continued)

(56) References Cited

U.S. PATENT DOCUMENTS

| 2003/0098111 | A1* | 5/2003 | Teeple ................ B60C 15/0018 |
| | | | 152/540 |
| 2005/0178487 | A1 | 8/2005 | Eynard et al. |
| 2012/0160390 | A1 | 6/2012 | Grisin et al. |

FOREIGN PATENT DOCUMENTS

| CN | 203004986 U | * | 6/2013 |
| EP | 1 216 851 A1 | | 6/2002 |

(Continued)

OTHER PUBLICATIONS

Ailin Zhang, CN 203004986, machine translation. (Year: 2013).*
(Continued)

*Primary Examiner* — Robert C Dye
*Assistant Examiner* — Sedef E Paquette
(74) *Attorney, Agent, or Firm* — Sughrue Mion, PLLC

(57) ABSTRACT

A tire (1) has two annular beads, a toroidal body ply (2) which is wound about the two beads (3) to form two turn-ups, and two bead fillers (8). Each bead filler (8) contacts a bead (3) and is at least partly enclosed in a turn-up (4) of the body ply (2), and comprises an elastomer filler strip (9) which is wound about the bead (3) and is interposed between the bead (3) and the body ply (2) and has two opposite ends (10, 11) located on opposite sides of the bead (3) and contacting each other. An outer end (11) of the filler strip (9) of each bead filler (8) is folded into a "U" about the corresponding end of the body ply (2) so as to enclose the end of the body ply (2).

7 Claims, 9 Drawing Sheets

(51) Int. Cl.
*B29D 30/30* (2006.01)
*B29D 30/32* (2006.01)
*B60C 9/02* (2006.01)
*B60C 15/00* (2006.01)

(52) U.S. Cl.
CPC ............... *B29D 30/48* (2013.01); *B60C 9/02* (2013.01); *B60C 15/0009* (2013.01); *B60C 15/0632* (2013.01); *B29D 2030/481* (2013.01); *B29D 2030/482* (2013.01); *B60C 2015/0617* (2013.01); *B60C 2015/0621* (2013.01); *B60C 2015/0625* (2013.01)

(58) Field of Classification Search
CPC ........ B60C 2015/0621; B60C 15/0607; B60C 15/0628; B60C 15/0635; B60C 2015/6025; B60C 2015/0678; B60C 2015/0682; B60C 2015/0685; B60C 2001/0058; B60C 1/0041; B60C 2009/0246; B60C 2009/0276; B29D 30/30; B29D 30/32; B29D 30/48; B29D 30/50; B29D 2030/486

USPC .................................................. 152/541, 539
See application file for complete search history.

(56) References Cited

FOREIGN PATENT DOCUMENTS

GB   2 276 357 A      9/1994
WO   2012/098500 A1   7/2012

OTHER PUBLICATIONS

International Search Report for PCT/IB2014/066757 dated Feb. 23, 2015.
Written Opinion for PCT/IB2014/066757 dated Feb. 23, 2015.
International Preliminary Report on Patentability dated Jun. 14, 2016 from the International Bureau in counterpart International Application No. PCT/IB2014/066757.

* cited by examiner

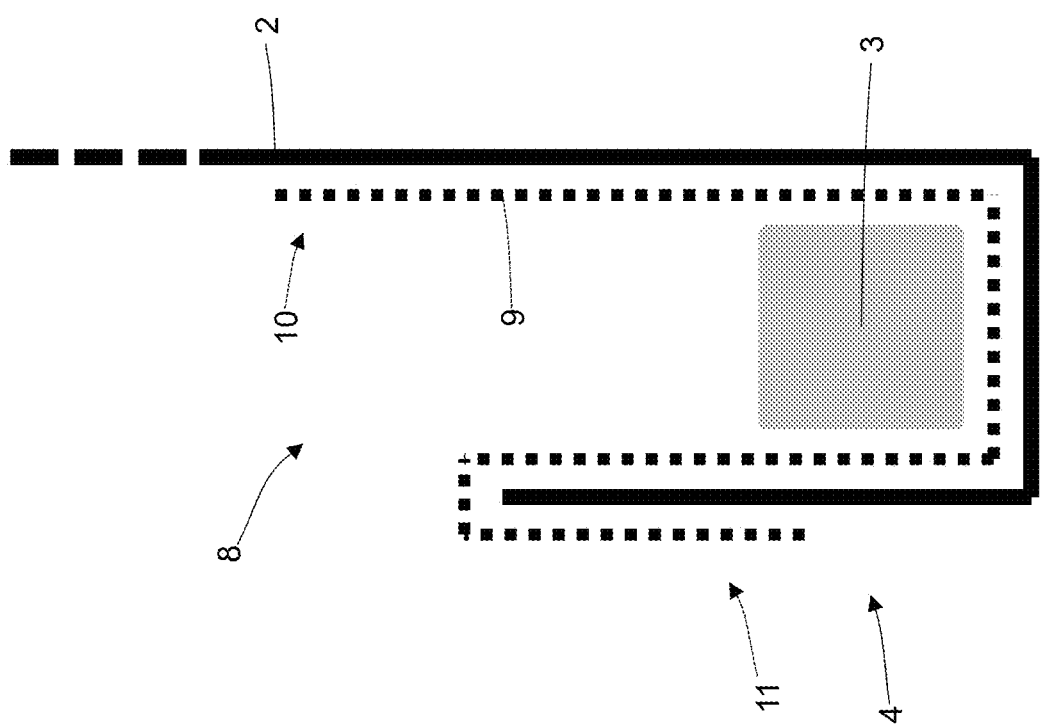

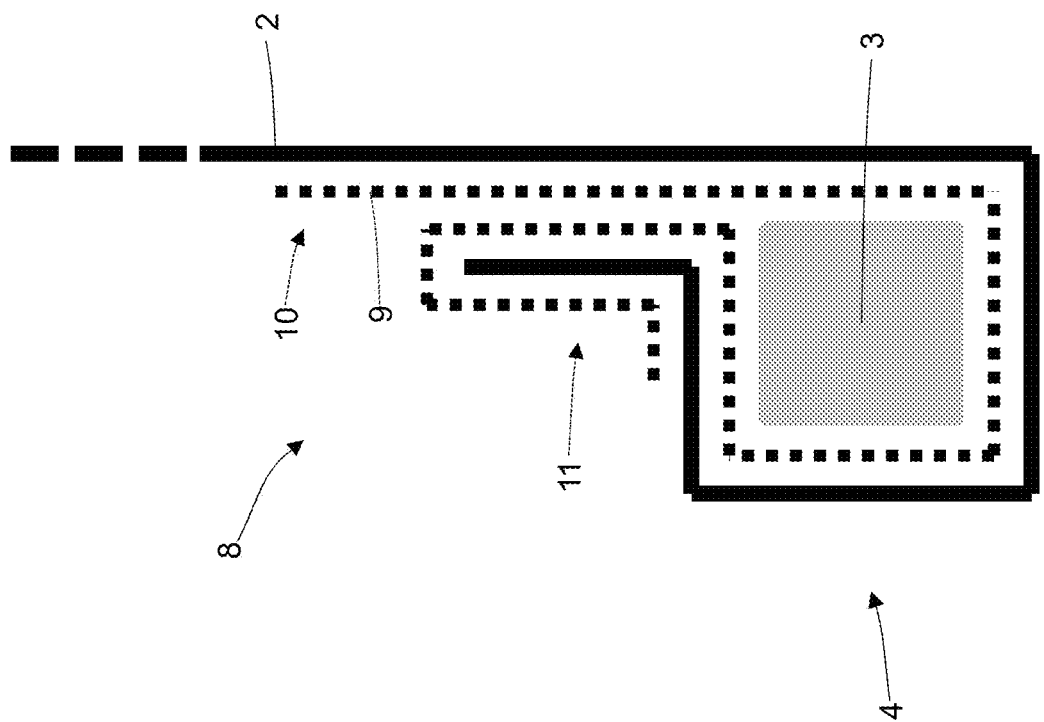

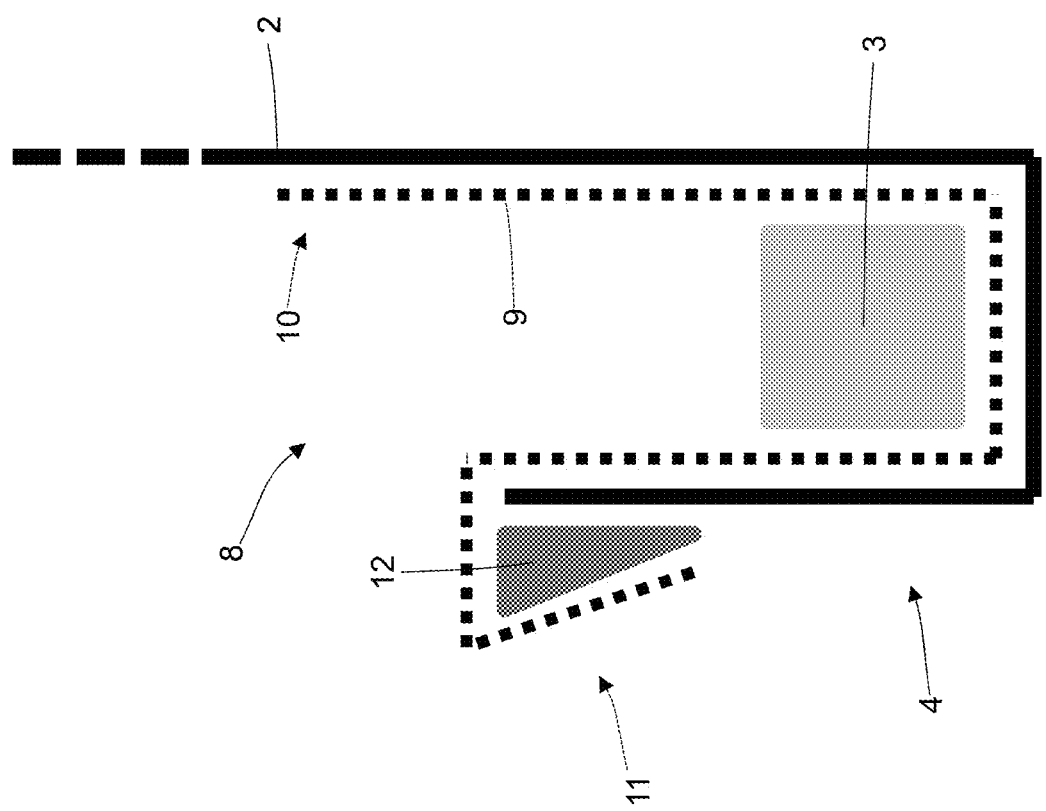

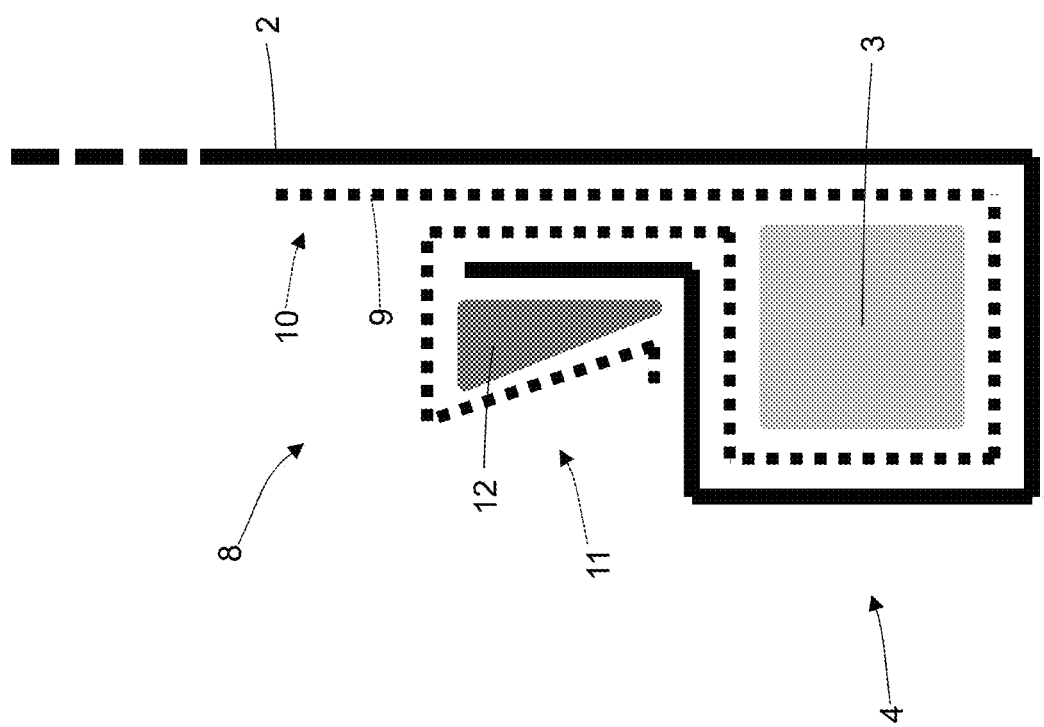

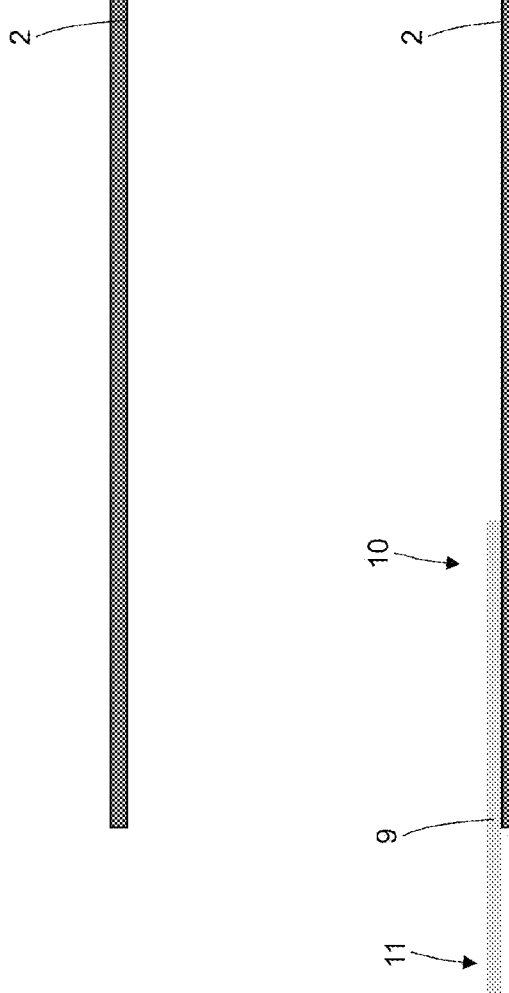
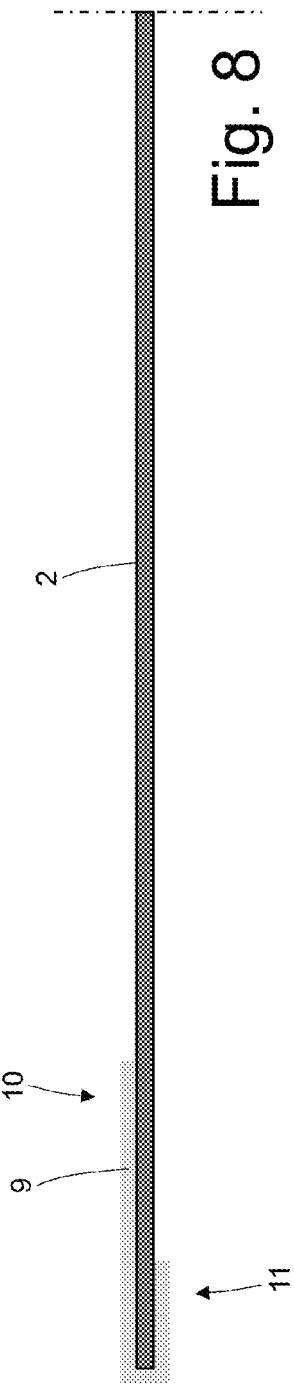

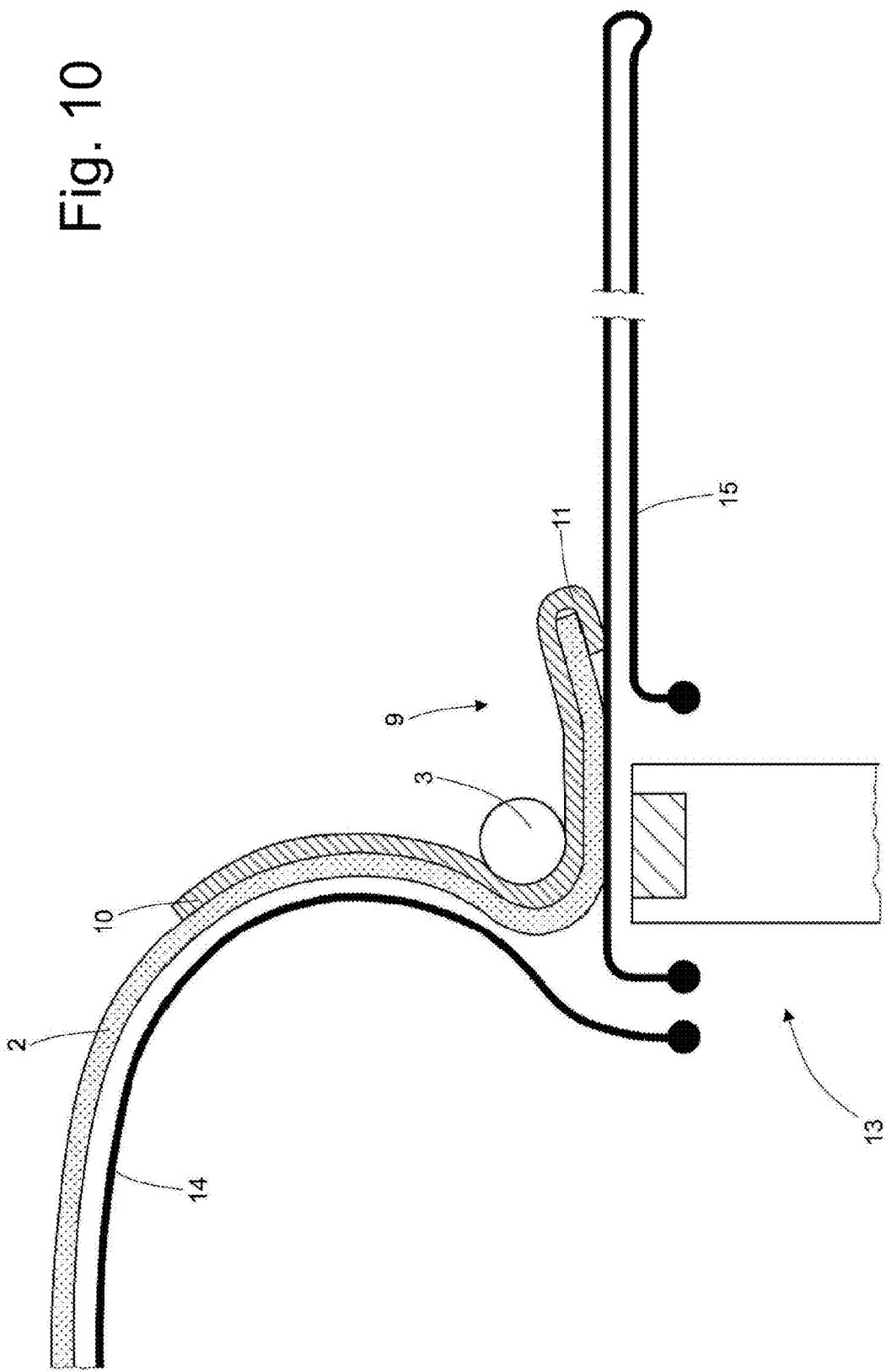

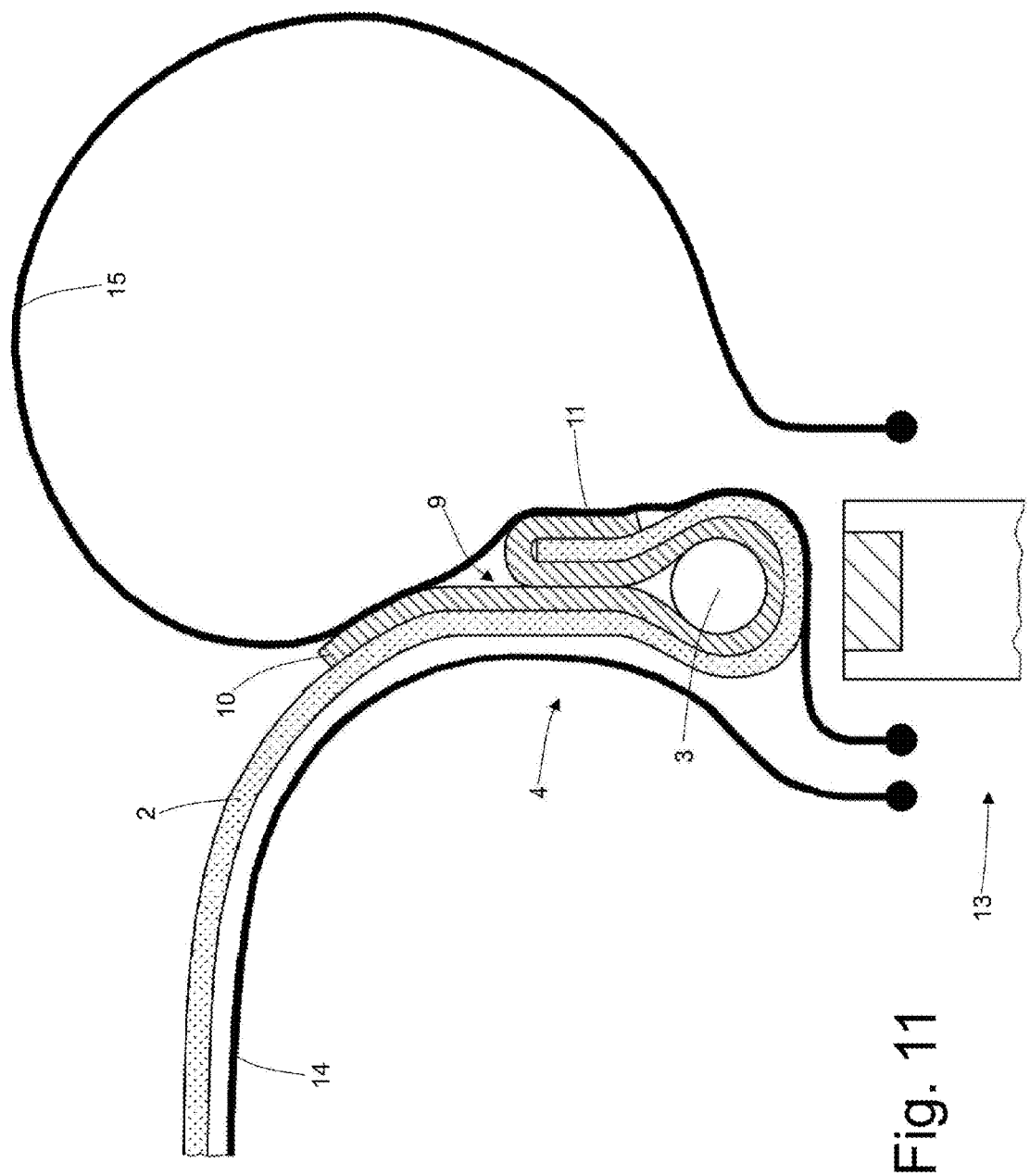

TIRE WITH FILLER STRIPS ENCLOSING BEAD CORES AND PLY ENDS

CROSS REFERENCE TO RELATED APPLICATIONS

This application is a National Stage of International Application No. PCT/IB2014/066757 filed Dec. 10, 2014, claiming priority based on Italian Patent Application No. RM2013A000681 filed Dec. 11, 2013, the contents of all of which are incorporated herein by reference in their entirety.

TECHNICAL FIELD

The present invention relates to a tyre and to a tyre building method.

PRIOR ART

A tyre comprises a toroidal body ply, which is wound around two annular beads and supports a tread. A tread belt is interposed between the body ply and the tread, which tread belt generally is constituted by a series of tread plies overlapped one onto the other. Each bead is constituted by a series of metallic cords plunged and enclosed in an elastomeric casing (the so-called "cerchietto"/"tyre clip"). Usually a bead filler is fitted to each bead, which bead filler is made of elastomeric having a high hardness to increase the stiffness of the tyre side walls and has a triangular section having a base contacting the bead.

Usually, and as described for example in patent application EP0310417A2, each bead filler is fitted to the corresponding bead before building the tyre and therefore the two beads together with the bead fillers are rested on the body ply lied around the forming drum before the "turn-up" operation.

The primary function of the bead filler is to guarantee a continuous variation in the elastic response of the materials constituting the relatively stiff bead and the relatively elastic flanks of the tyre; however, the presence of the bead filler involves the drawback of influencing negatively the mass and then the rolling efficiency of the tyre both directly, due to the mass of the bead filler itself, and indirectly, as it requires the use of relatively wide turned-over portions of the body ply.

In order to improve the tyre performances, it has been proposed to implement a so-called tyre "without the bead filler" (for example as described in patent application WO2012098500A1), wherein the traditional bead filler with triangular shape is replaced by an elastomeric filler ring which at first was arranged stretched between the body ply and a bead, it was folded into a "U" around the bead when the corresponding turn-up of the body ply was formed until bringing in close proximity two opposite ends of the elastomeric ring, and at last it was cured after being folded into a "U" around the bead to connect therebetween the two opposite ends of the elastomeric ring.

However, it has been observed that in some implementations the so-called tyres "without the bead filler" may have a relatively reduced duration as they are subjected to cracks at body ply ends, which cracks propagate as far as the outer surface of the bead itself in relatively short time.

DESCRIPTION OF THE INVENTION

The object of the present invention is to provide a tyre and a tyre building method without the drawbacks mentioned above and at the same time which are easy and cost-effective to be implemented.

According to the present invention a tyre and a tyre building method are provided, according to what established in the enclosed claims.

BRIEF DESCRIPTION OF THE DRAWINGS

The present invention will be now described by referring to the enclosed drawings, which illustrate some not-limiting embodiment examples thereof, wherein:

FIGS. 2 and 3 are two schematic views and in enlarged scale of a bead area of the tyre of FIG. 1;

FIGS. 4 and 5 are two schematic views and in enlarged scale of a variant of the bead area of the tyre of FIG. 1;

FIGS. 6, 7 and 8 are three schematic views of respective subsequent steps of the preparation of a body ply for building the tyre of FIG. 1; and FIGS. 9, 10 and 11 are three schematic, partial views, with removed portions for sake of clarity of a forming drum during respective subsequent steps of building the tyre of FIG. 1.

PREFERRED EMBODIMENTS OF THE INVENTION

Figure 1:
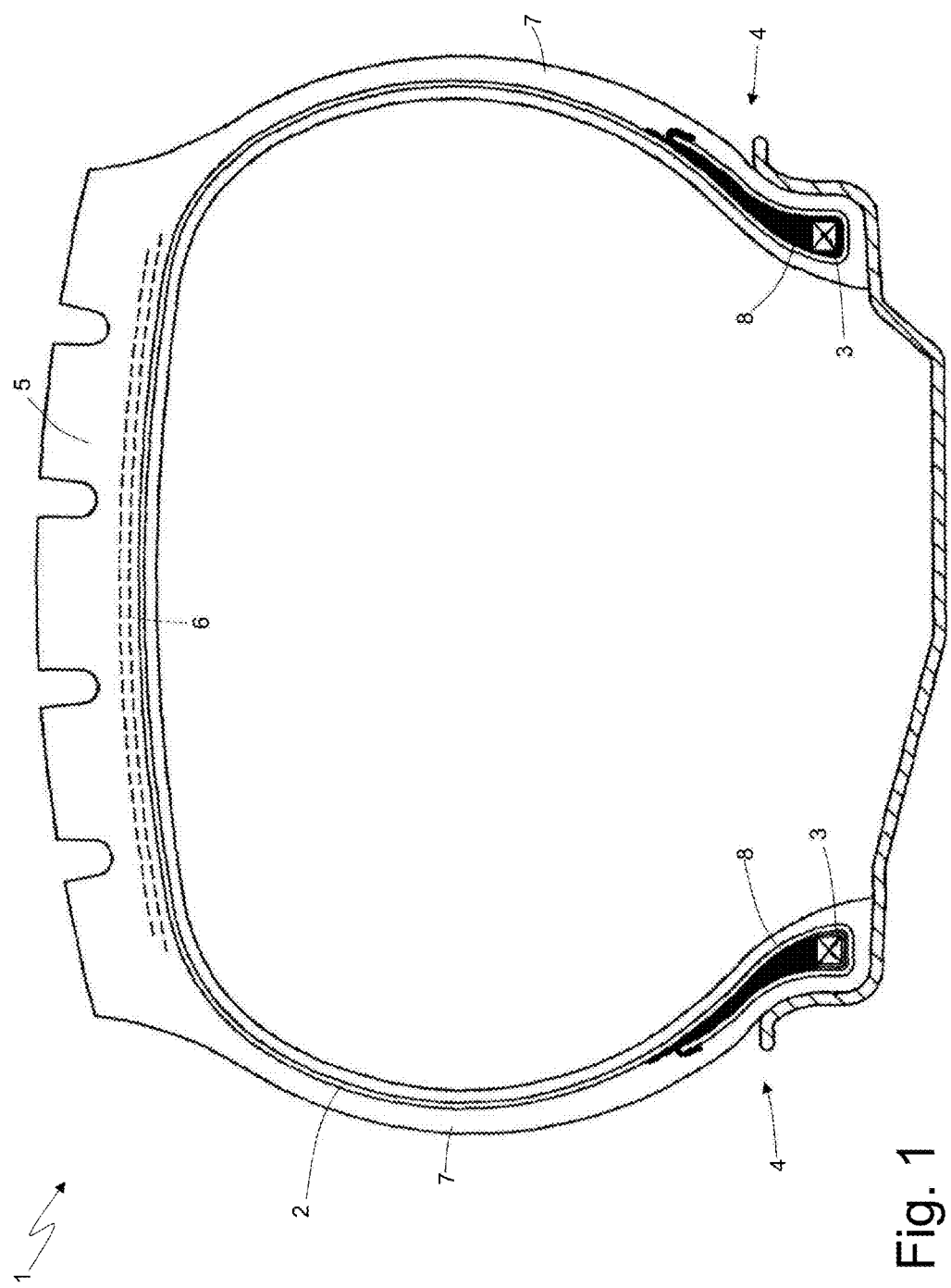
FIG. 1 illustrates schematically a cross-section of a portion of a tyre implemented according to the present invention.

In FIG. 1, a tyre is designated as a whole with numeral 1, comprising a toroidal body ply 2 which is wound about two annular beads 3 to form two turn-ups 4 about the two beads 3 themselves; each bead 3 is constituted by a series of metallic cords plunged and enclosed in an elastomeric casing (the so-called "cerchietto"/"tyre clip"). The tyre 1 comprises a tread 5 supported by the body ply 2 and a tread belt 6 which is interposed between the body ply 2 and the tread 5 and it comprises a number of tread plies. The tyre 1 comprises a pair of side walls 7 which are supported by the body ply 2 and are arranged between the tread 5 and the beads 3. The tyre comprises two bead fillers 8, each one thereof contacts a bead 3 and it is at least partially enclosed in a turn-up 4 of the body ply 2.

According to what illustrated in FIGS. 2 and 3, each bead filler 8 is constituted by a green (that is raw) elastomer (that is rubber compound) filler strip 9 which at first is placed stretched between the body ply 2 and a bead 3 when the body ply 2 is still flat (as illustrated in FIGS. 6, 7 and 8) and it is folded into a "U" around the bead 3 when the corresponding turn-up 4 of the body ply 2 is formed until bringing in contact with each other two opposite ends 10 and 11 of the filler strip 9 itself (as illustrated in FIG. 3, whereas in FIG. 2 for better clarity the two ends 10 and 11 have been drawn separately). When the tyre 1 is cured, the two opposite ends 10 and 11 of the filler strip 9 are connected therebetween (that is melted together) by eliminating at the same time the air enclosed inside the turn-up 4 of the body ply 2 (that is by eliminating the interstitial spaces existing inside the turn-up 4 of the body ply 2).

As clearly illustrated in FIGS. 6, 7 and 8, the filler strip 9 at first has a cross-section with rectangular shape and a constant thickness; subsequently, during the building of the tyre 1 the thickness of the filler strip 9 can vary locally (by increasing and decreasing) due to the effect of the tensions and pressures which are applied to the filler strip 9 (especially during curing).

The outer end 11 of the filler strip 9 of each bead filler 8 is folded into a "U" about the corresponding end of the body ply 2 so as to enclose the end of the body ply 2; in this way, the end of the body ply 2 is enclosed inside the outer end 11 of the filler strip 9 and then the outer end 11 of the filler strip 9 forms a "cap" containing the end of the body ply 2.

According to the alternative embodiment illustrated in FIGS. 4 and 5, in each bead filler 8 between the end of the body ply 2 and the outer end 11 of the filler strip 9 an annular elastomer (that is rubber compound) insert 12 with triangular cross-section is interposed which is entirely covered by the outer end 11 of the filler strip 9 (that is wholly enclosed inside the outer end 11 of the filler strip 9). Each annular insert 12 has a triangular cross-section and it is oriented so that its thickness decreases gradually towards the bead 3. In particular, the annular insert 12, in cross-section, has the shape of a right-angled triangle, wherein the right angle is arranged at the end of the body ply 2 (that is, a long cathetus is arranged in contact with the body ply 2, a short cathetus is arranged in contact with an intermediate portion of the outer end 11 of the filler strip 9, and the hypotenuse is arranged in contact with an ending portion of the outer end 11 of the filler strip 9); in other words, the hypotenuse (which represents the wider side of the annular insert 12) is arranged inside, that is it "faces" outwards.

According to a preferred embodiment, the annular insert 12 is made of a (substantially) harder rubber compound than the rubber compound of the filler strip 9; preferably, the annular insert 12 is made of (substantially) a harder rubber compound even than the rubber compound constituting an elastomer coating of the body ply 2.

Preferably, the two opposite ends 10 and 11 of the filler strip 9 in each bead filler 8 have a different height; in particular, the inner end 10 of the filler strip 9 has a higher height than the outer end 11 of the filler strip 9; consequently, the inner end 10 of the filler strip 9 (that is the highest end of the filler strip 9) comes out from the turn-up 4 of the body ply 2.

According to a preferred embodiment, the filler strip 9 is constituted by a softer elastomeric compound than the elastomeric compound constituting a conventional bead filler; generally, the filler strip 9 is constituted by an elastomeric compound having a module with 50% deformation comprised between 1 and 10 MPa and an elongation at fracture between 100% and 500% and, according to a preferred embodiment, the filler strip 9 is constituted by an elastomeric compound having a module with 50% deformation comprised between 2.5 and 7 MPa and an elongation at fracture between 130% and 450%. According to an alternative embodiment, the filler strip 9 is constituted by the same elastomeric compound constituting a conventional bead filler.

According to what illustrated in FIGS. 6-11, the above-described method for building the tyre 1 will be described hereinafter with particular reference to the building of the area of a bead 3.

At first and as illustrated in FIG. 6, the stretched (that is with flat shape) body ply 2 is rested on a (known and not illustrated) working plane and subsequently, as illustrated in FIG. 7, two stretched (that is with flat shape) filler strips 9 are rested on top of the body ply 2 at the two opposite ends of the body ply 2 itself (by sake of simplicity FIG. 7 shows only a portion of the body ply 2 and thus only one of the two filler strips 9). Subsequently and as illustrated in FIG. 8, the outer end 11 of each filler strip 9 is folded into a "U" about the end of the body ply 2 so as to enclose the end of the body ply 2.

Figure 9:
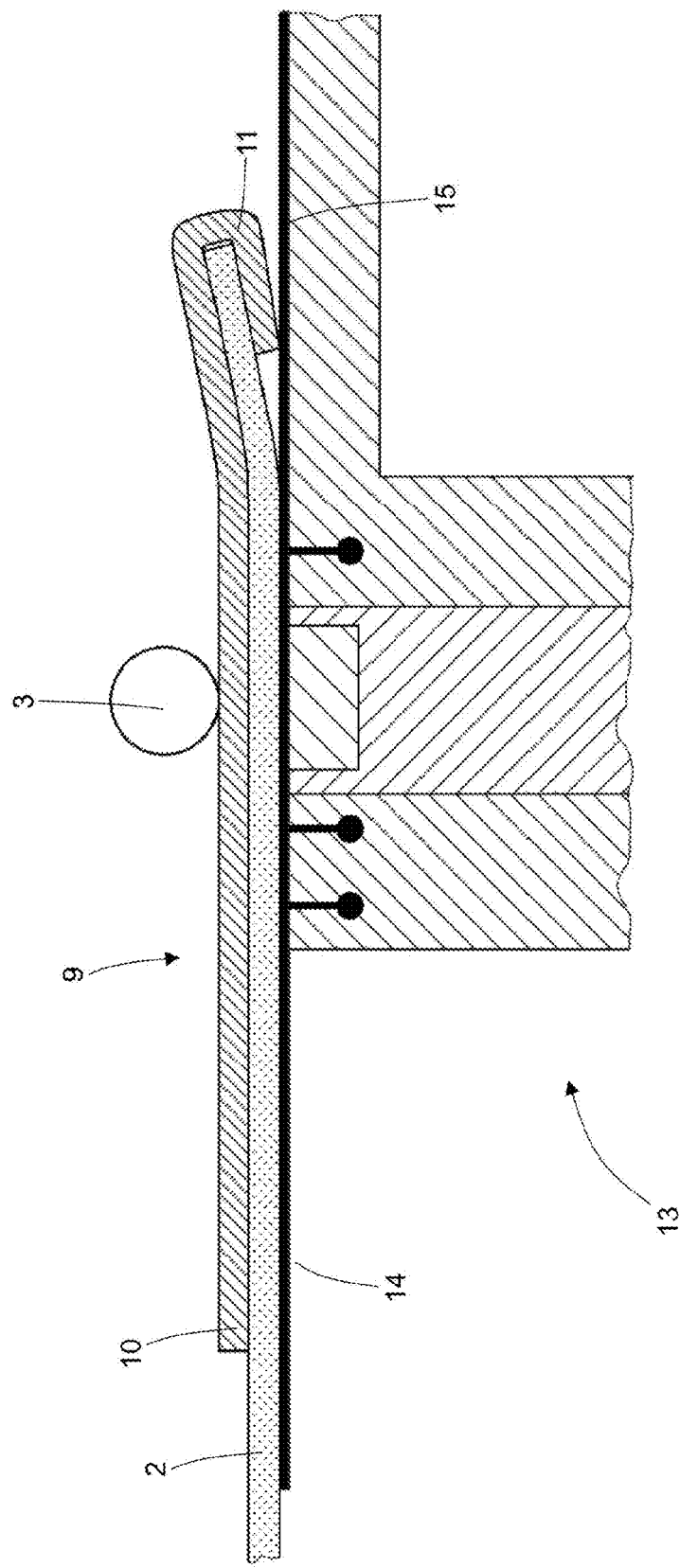

At this point and as illustrated in FIG. 9, the body ply 2 fitted to the filler strips 9 is wound about a building drum 13 by giving the body ply 2 (and then the two filler strips 9) an annular shape. Subsequently, the two beads 3 are arranged on top of the two filler strips 9 (and then on top of the body ply 2) so that each filler strip 9 is arranged between the body ply 2 and a bead 3. Preferably, the two beads 3 are arranged on top of the two filler strips 9 only after having placed the body ply 2 equipped with the filler strips 9 about the building drum 13 and on top of the body ply 2; in this way, it is possible obtaining a more precise positioning of the two beads 3 by increasing the overall symmetry of the tyre 1 (thus, by reducing the vibrations during rolling).

At this point, and as illustrated in FIGS. 10 and 11, the "turn-up" of the body ply 2 is performed by expanding, by means of swelling, bladders 14 and 15 of the building drum 13; the "turn-up" of the body ply 2 winds the body ply 2 together with the filler strips 9 about the two beads 3 to form the two turn-ups 4 of the body ply 2 and, at the same time, to fold into a "U" each filler strip 9 about the bead 3 by bringing in mutual contact the two opposite ends 10 and 11 of the filler strip 9 itself.

Once ended the "turn-up" of the body ply 2, the tyre 1 is structurally complete and it has to be subjected to a curing process in a curing mould. The pressure and the heat which are applied to the tyre 1 during curing determine the mutual welding of the two opposite ends 10 and 11 of each filler strip 9 and at the same time eliminate the air enclosed inside the turn-up 4 of the body ply 2.

In the above-illustrated description of building the tyre 1 the applications of other components of the tyre 1 (the tread 5, the tread belt 6, the side walls and other not illustrated ones, such as, the small sheet or "innerliner" and the anti-abrasive strips or "Abrasion Gum Strips—AGS") have not been mentioned since the application of such components takes place according to known modes; however it is clear that the building of the tyre 1 is more complex and articulated than what described above which limits to describe in details only the building steps related to the bead fillers 8. In particular, it is important noting that the curing takes place once the building of the tyre 1 is finished when all components of the tyre 1 have been assembled together.

The above-described tyre 1 has several advantages.

First of all, the above-described tyre 1 has a duration, that is a useful life, considerably longer than an analogous tyre wherein the outer end 11 of each filler strip 9 is not folded into a "U" about the end of the body ply 2. Such result is obtained thanks to the fact that possible cracks which may generate inside the body ply 2 in the area of the bead 3 are no more directed in a mainly axial way (as it happens when the outer end 11 of each filler strip 9 is not folded into a "U" about the end of the body ply 2), but they are directed in a mainly radial way and therefore to determine the rupture of the body ply 2 they must travel a longer path (which obviously requires a longer time to be completed). In other words, when the outer end 11 of each filler strip 9 is folded into a "U" about the end of the body ply 2, at the area of the bead 3 a structural anisotropy takes place which tends to direct radially possible cracks which may generate inside the body ply 2, consequently by lengthening the path which the cracks must travel to determine the rupture of the body ply 2 and then by extending considerably the useful life of the tyre 1.

By summing-up, when the outer end 11 of each filler strip 9 is folded into a "U" about the end of the body ply 2 for the possible cracks, which may generate inside the body ply 2 in the area of the bead 3, a preferential (privileged) propagation path is created which is directed radially and then it is considerably longer than the axial propagation path typical in a tyre 1 wherein the outer end 11 of each filler strip 9 is not folded into a "U" about the end of the body ply 2.

The presence of triangular inserts 12 further increases the duration, that is the useful life, of the tyre 1 as it further lengthens the path which the cracks have to travel to determine the rupture of the body ply 2.

Furthermore, in the above-described tyre 1 the two bead fillers 8 has a definitely more reduced mass with respect to an analogous conventional tyre; in other words, the above-described bead filler 8 is definitely smaller and thus lighter than a conventional bead filler and it has a mass saving which can reach up to 50%-60% with respect to a conventional bead filler. In this way, the above-described tyre 1 is both more cost-effective (for the material saving) and it has more performance (for the weight saving) with respect to an analogous conventional tyre. To this purpose it is important observing that the filler strips 9 are made of elastomer (that is rubber compound) which is a generally economic material (in particular definitely more economic than analogous reinforcements, made of fabric, which sometimes are used in the area of the bead 3).

At last, the above-described tyre 1 is simple (and thus little expensive) to be built since the building modes are simplified with respect to the modes for building a conventional tyre. In fact, in the building of a conventional tyre each bead filler has to be fitted to the corresponding bead before building the tyre and such procedure is particularly complex as it is necessary to guarantee an optimum and durable adherence of the bead filler to the underneath bead to avoid undesirable detachments during building (that is before curing); on the contrary, the above-described bead filler 8 is constituted by the filler strip 9 which is wound into a "U" about the bead 3 and then due to the effect of such shape a separation between the bead filler 8 and the bead 3 is simply impossible. Furthermore, the fitting between the body ply 2 and the two filler strips 9 takes place before winding the body ply 2 about the building drum 13, when both the body ply 2 and the two filler strips 9 are flat and wholly stretched, that is it takes place under optimum conditions which make such fitting particularly simple and fast.

The fact of fitting the two filler strips 9 to the body ply 2 before winding the body ply 2 about the building drum 13 has even an additional advantage: when the body ply 2 fitted to the two filler strips 9 is wound about the building drum 13, the two filler strips 9 are put in tension and then they tend to crush with strength against the body ply 2; in this way, possible interstitial spaces existing between the filler strips 9 and the body ply 2 are eliminated and therefore possible air trapped between the filler strips 9 and the body ply 2 is expelled by obtaining an optimum connection. Consequently, the probability is reduced that upon use cracks are generated in the body ply 2 with a clear improvement in the duration of the tyre 1.

The invention claimed is:

1. A tire comprising:
   two annular beads;
   a toroidal body ply which is wound about the two annular beads to form two turn-ups; and
   two bead fillers, each of which contacts a respective bead of said two annular beads, wherein each bead filler is at least partly enclosed in a respective turn-up of said two turn-ups and comprises a filler strip which is wound about the respective bead, and wherein each filler strip is interposed between the respective bead and the body ply and has two opposite ends located on opposite sides of the respective bead and contacting each other,
   wherein an outer end of each filler strip is folded into a U shape around a corresponding end of the body ply so as to enclose the end of the body ply,
   wherein each bead of said two annular beads comprises an annular elastomer insert with a triangular cross section, and each annular elastomer insert is interposed between an end of the body ply and the outer end of each filler strip, and each annular elastomer insert is covered entirely by the outer end of each filler strip, and
   wherein each annular elastomer insert has a right-triangle-shaped cross section, a right-angle of which is located at a corresponding end of the body ply, and a hypotenuse of which is positioned contacting an end portion of the outer end of each filler strip.

2. The tire as claimed in claim 1, wherein each end of the body ply is enclosed inside the outer end of a corresponding filler strip, so the outer end of each filler strip forms a cap containing each end of the body ply.

3. The tire as claimed in claim 1, wherein each annular elastomer insert is oriented so that its thickness decreases gradually toward the bead.

4. The tire as claimed in claim 1, wherein the triangular cross section of each annular elastomer insert has a long side facing outwards from the toroidal body ply.

5. The tire as claimed in claim 1, wherein each annular elastomer insert is made of a harder rubber compound than a rubber compound constituting the filler strips.

6. The tire as claimed in claim 1, wherein each annular elastomer insert is made of a harder rubber compound than a rubber compound constituting an elastomer covering of the body ply.

7. The tire as claimed in claim 1, wherein each filler strip is interposed completely between a corresponding bead and the body ply, so that the body ply never touches directly the bead.

* * * * *